United States Patent
Schmidt

(10) Patent No.: US 7,061,168 B2
(45) Date of Patent: Jun. 13, 2006

(54) INFRARED REFLECTOR AND INFRARED RADIATOR HAVING AN INFRARED REFLECTOR

(75) Inventor: Hans-Joachim Schmidt, Ingolstadt (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 10/928,113

(22) Filed: Aug. 30, 2004

(65) Prior Publication Data
US 2005/0052105 A1 Mar. 10, 2005

(30) Foreign Application Priority Data
Sep. 5, 2003 (DE) .................. 103 41 502

(51) Int. Cl.
*H01J 5/16* (2006.01)
*H01J 61/40* (2006.01)
*F21V 7/22* (2006.01)
*F21V 9/00* (2006.01)

(52) U.S. Cl. .............. 313/113; 313/110; 313/112
(58) Field of Classification Search .............. 313/113
See application file for complete search history.

(56) References Cited

U.S. PATENT DOCUMENTS

| 2,181,292 | A | * | 11/1939 | Biggs | 313/114 |
| 3,188,513 | A | * | 6/1965 | Hansler | 313/110 |
| 4,758,761 | A | * | 7/1988 | Ingeveld et al. | 313/113 |
| 5,977,694 | A | * | 11/1999 | McGuire | 313/113 |

FOREIGN PATENT DOCUMENTS

| EP | 577196 A1 * | 1/1994 |
| EP | 1 072 841 | 1/2001 |
| EP | 1 072 841 A3 | 1/2001 |

* cited by examiner

*Primary Examiner*—Nimeshkumar D. Patel
*Assistant Examiner*—Natalie K. Walford
(74) *Attorney, Agent, or Firm*—William E. Meyer

(57) ABSTRACT

The invention relates to a reflector for an infrared radiator, having a blackened Eloxal layer, and to an infrared radiator having a halogen incandescent lamp as radiation source and such a reflector.

2 Claims, 2 Drawing Sheets

INFRARED REFLECTOR AND INFRARED RADIATOR HAVING AN INFRARED REFLECTOR

I. TECHNICAL FIELD

Figure 1:
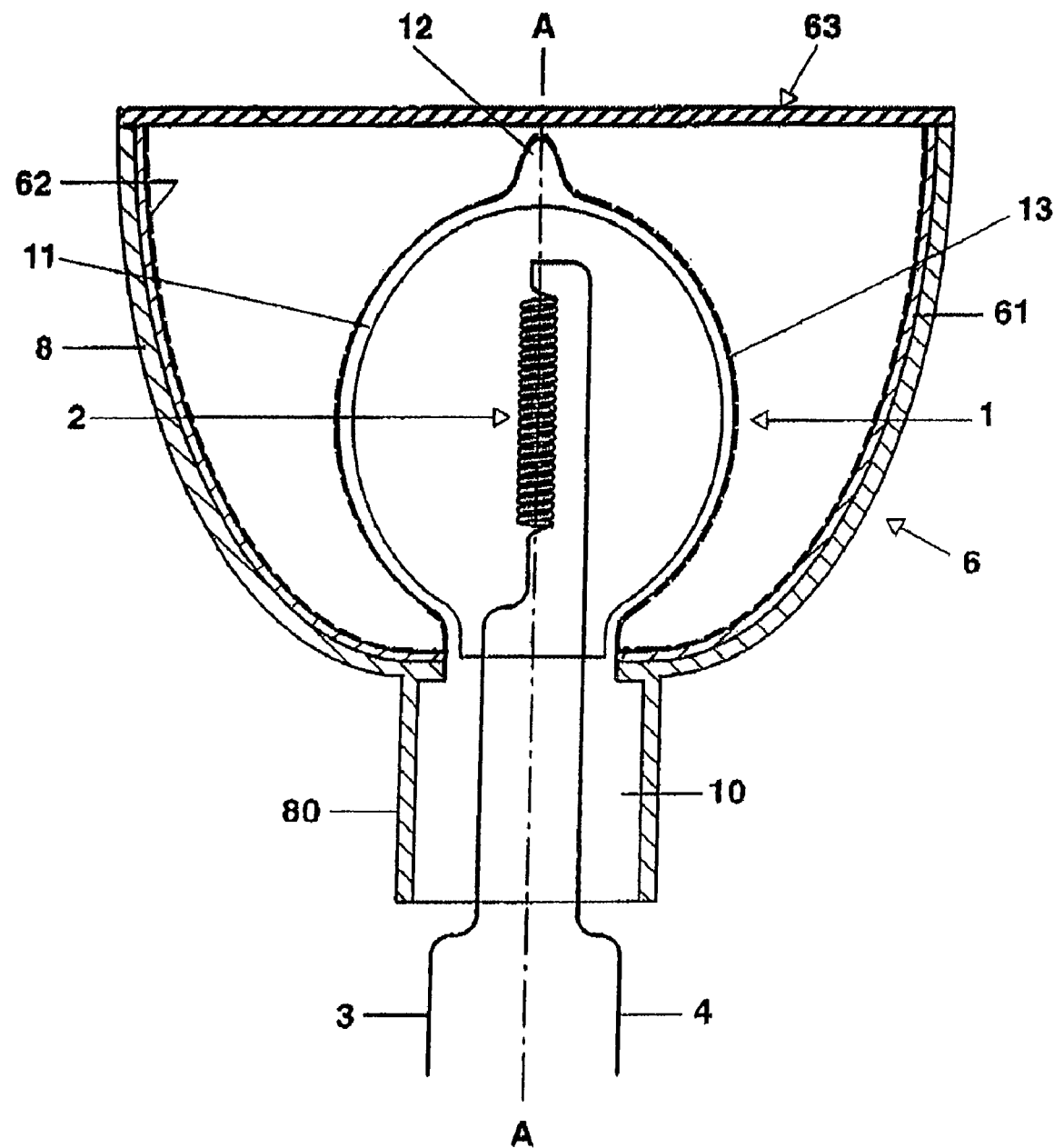

The invention relates to a reflector for infrared radiation having at least one layer made from anodized aluminum, and to an infrared radiator having such a reflector.

II. BACKGROUND ART

Laid-open application EP 1 072 841 A2 describes an infrared radiator having an incandescent lamp as radiation source and a parabolic reflector that is of transparent design and reflects the infrared radiation in the desired direction. The reflector opening is covered by means of an opaque filter disk.

III. DISCLOSURE OF THE INVENTION

It is the object of the invention to provide a reflector for infrared radiation and an infrared radiator having as simple a design as possible.

This object is achieved according to the invention by a reflector for infrared radiation having at least one layer made from anodized aluminum, wherein the at least one layer is a blackened Eloxal layer. Particularly advantageous embodiments of the invention are described in the dependent patent claims.

According to the invention, the inventive reflector for infrared radiation is provided with at least one blackened Eloxal layer. This lends the surface of the reflector a high reflectivity for infrared radiation in the wavelength region above 780 nm, and at the same time maximum suppression is achieved for radiation from the visible spectral region, since the blackened Eloxal layer acts in a light-absorbing fashion. At a wavelength of 780 nm, the blackened Eloxal layer has a reflectivity of 55%, which grows continuously with increasing wavelengths at approximately 1200 nm to a value of 90% of the radiation striking the Eloxal layer. The inventive reflector therefore provides a cost effective alternative to a conventional gold-coated infrared reflector. Moreover, the inventive reflector can be combined with a commercially available halogen incandescent lamp to form an infrared radiator of high efficiency, since the halogen incandescent lamp outputs the majority of its energy in the form of radiation in the wavelength region of above 780 nm, and the light emitted by the halogen incandescent lamp is largely absorbed by the blackened Eloxal layer.

In the wavelength region from 780 nm to 1200 nm, the reflectivity of the inventive reflector can advantageously be raised by means of a transparent interference filter that reflects infrared rays and is arranged on the blackened Eloxal layer. The reflector preferably consists of aluminum for reasons of cost.

The inventive infrared radiator has a halogen incandescent lamp as radiation source, and a reflector that is provided with at least one blackened Eloxal layer. The blackened Eloxal layer lends the surface of the reflector a high reflectivity for infrared radiation in the wavelength region above 780 nm, and at the same time maximum suppression is ensured for radiation from the visible spectral region, since the blackened Eloxal layer acts in a light-absorbing fashion. Since the halogen incandescent lamp outputs the majority of its energy in the form of infrared radiation in the wavelength region above 780 nm, and since the light emitted by the halogen incandescent lamp is largely absorbed by the blackened Eloxal layer, virtually no radiation from the visible spectral region is reflected at the reflector. The inventive infrared radiator operates with particular efficiency for infrared radiation from the wavelength region from 1200 nm to 2500 nm, since the reflectivity of the blackened Eloxal layer is approximately 90% in this wavelength region. In order to raise the reflectivity of the inventive reflector in the wavelength region from 780 nm to 1200 nm, the reflector can additionally be coated with a transparent interference filter that reflects infrared radiation and is arranged on the blackened Eloxal layer.

In order to suppress the light generated by the incandescent filament of the halogen incandescent lamp, the lamp vessel of the halogen incandescent lamp is advantageously provided with a diathermic mirror that retroreflects into the lamp vessel light generated by the incandescent filament, and is transparent to infrared radiation. Alternatively, the reflector opening can be provided with an opaque cover transparent to infrared radiation.

IV. BRIEF DESCRIPTION OF THE DRAWINGS

Figure 2:
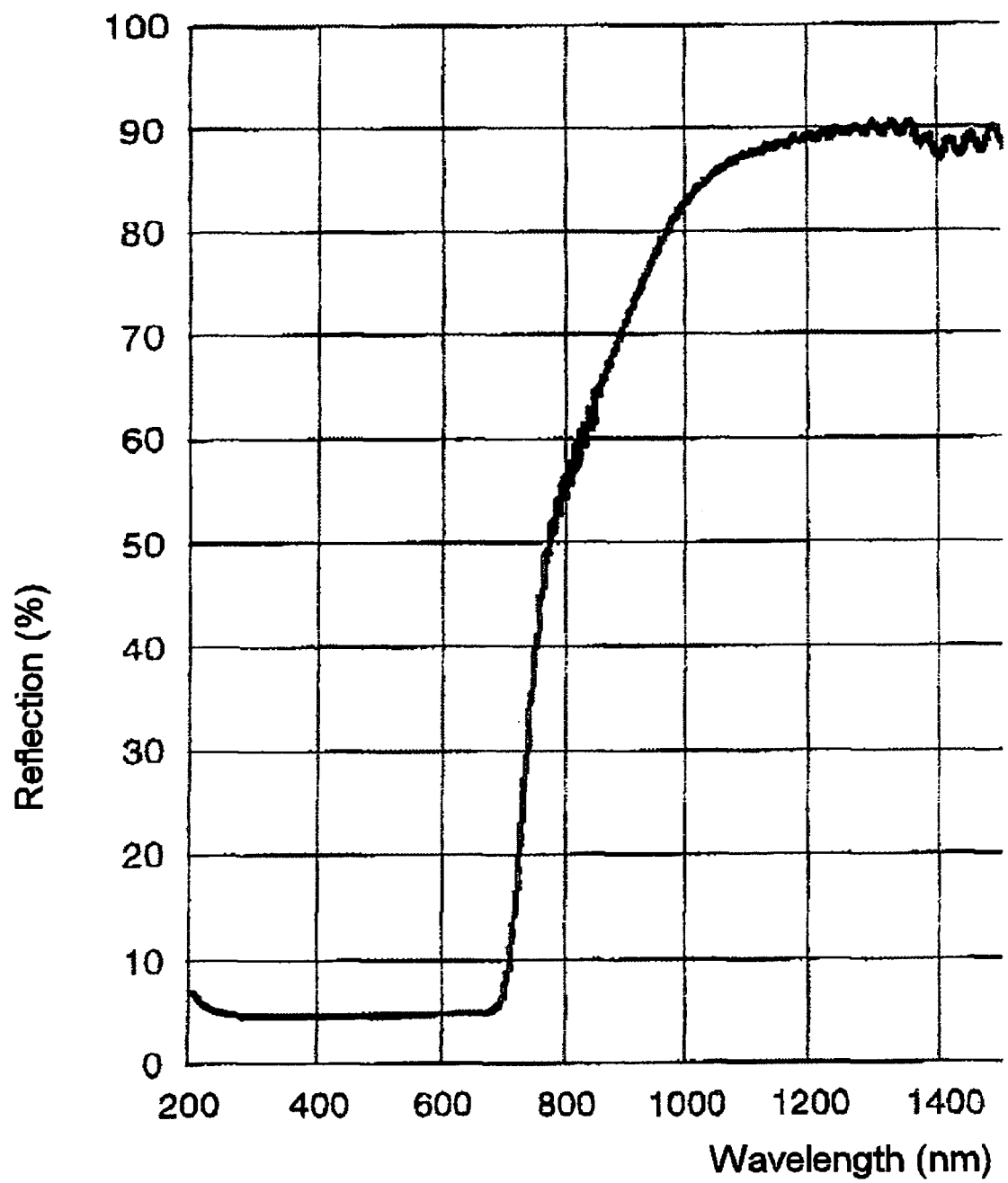

The invention is explained in more detail below with the aid of a preferred exemplary embodiment. In the drawing:

FIG. 1 shows a partially sectioned side view of an infrared radiator in accordance with the preferred exemplary embodiment of the invention, and FIG. 2 shows the reflectivity of the blackened Eloxal layer of the reflector as a function of the wavelength of the incident radiation.

V. BEST MODE FOR CARRYING OUT THE INVENTION

The infrared radiator illustrated in FIG. 1 has as radiation source a halogen incandescent lamp 1 having an electric power consumption of approximately 50 watts. It has a lamp vessel made from silica glass that is sealed at one end. Arranged in the interior of the lamp vessel is an incandescent filament 2 made from tungsten that is supplied with electric energy by means of two supply leads 3, 4 projecting from the sealed end 10 of the lamp vessel. The region 11 of the lamp vessel surrounding the incandescent filament is coated with an interference filter 13 that is designed as a diathermic mirror, is transparent to infrared radiation, and retroreflects into the lamp vessel for the purpose of filament heating the light generated by the incandescent filament. The interference filter 13 also extends over the dome 12 of the lamp vessel.

The infrared radiator also has a shell-shaped, preferably parabolic reflector 6 whose basic body 8 consists of aluminum and whose inner side facing the halogen incandescent lamp 1 is provided with a blackened Eloxal layer 61. The lamp 1 and reflector 6 may be located on a common axis A. This blackened Eloxal layer is an Eloxal layer having the hue EV6 in accordance with the designation of the Eloxal Association. The reflector 6 surrounds the halogen incandescent lamp 1. The sealed end 10 of the lamp vessel of the halogen incandescent lamp 1 is arranged in the reflector neck 80.

The invention is not limited to the exemplary embodiment described in more detail above. In order to improve the reflectivity of the reflector 6, it is possible, for example, to apply to the Eloxal layer 61 an interference filter 62 that reflects infrared rays and transmits light. Instead of, or additionally to the diathermic mirror 13 on the lamp vessel, the reflector opening can be covered by means of an opaque cover disk 63 transmitting infrared radiation, in order to suppress the emission of light.

What is claimed is:

1. A reflector for infrared radiation comprising a reflector having a reflective surface having at least one layer made from anodized aluminum, the at least one layer being a blackened eloxal layer, wherein a transparent interference filter reflecting infrared rays is arranged on the blackened eloxal layer.

2. An infrared radiator comprising: a halogen incandescent lamp as radiation source and a reflector, wherein the reflector is provided with at least one blackened eloxal layer, wherein a transparent interference filter reflecting infrared rays is arranged on the blackened eloxal layer.

* * * * *